United States Patent
Nagai et al.

(10) Patent No.: US 9,156,160 B2
(45) Date of Patent: Oct. 13, 2015

(54) ROBOT SYSTEM, CALIBRATION METHOD, AND METHOD FOR PRODUCING TO-BE-PROCESSED MATERIAL

(71) Applicant: KABUSHIKI KAISHA YASKAWA DENKI, Kitakyushu-shi (JP)

(72) Inventors: Ryoichi Nagai, Kitakyushu (JP); Tamio Nakamura, Kitakyushu (JP); Dai Kouno, Kitakyushu (JP); Tetsuro Izumi, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/201,931

(22) Filed: Mar. 10, 2014

(65) Prior Publication Data

US 2014/0277715 A1    Sep. 18, 2014

(30) Foreign Application Priority Data

Mar. 15, 2013   (JP) ................. 2013-053528

(51) Int. Cl.
   *G05B 19/418* (2006.01)
   *B25J 9/00* (2006.01)
   *B25J 9/16* (2006.01)
   *B25J 21/00* (2006.01)

(52) U.S. Cl.
   CPC .............. *B25J 9/0084* (2013.01); *B25J 9/1682* (2013.01); *B25J 9/1692* (2013.01); *B25J 21/00* (2013.01); *Y10S 901/08* (2013.01)

(58) Field of Classification Search
   CPC ........ B25J 9/1692; B25J 9/162; B25J 13/081; B25J 19/023; B25J 9/1612; B25J 9/0084; B25J 9/1664

USPC ............ 700/248, 254, 258; 901/8, 30, 31, 46
See application file for complete search history.

(56) References Cited

U.S. PATENT DOCUMENTS

| | | | | |
|---|---|---|---|---|
| 4,481,592 A | * | 11/1984 | Jacobs et al. | 700/254 |
| 4,613,943 A | * | 9/1986 | Miyake et al. | 700/251 |
| 4,806,066 A | * | 2/1989 | Rhodes et al. | 414/729 |
| 4,815,006 A | * | 3/1989 | Andersson et al. | 700/254 |
| 4,831,549 A | * | 5/1989 | Red et al. | 700/254 |
| 4,908,777 A | * | 3/1990 | Wolfe | 700/254 |
| 5,297,238 A | * | 3/1994 | Wang et al. | 700/259 |

(Continued)

FOREIGN PATENT DOCUMENTS

| | | |
|---|---|---|
| JP | 3632278 B2 | 8/1997 |
| JP | 2005-342832 | 12/2005 |

OTHER PUBLICATIONS

Japanese Office Action for corresponding JP Application No. 2013-053528, Sep. 16, 2014.

(Continued)

*Primary Examiner* — Khoi Tran
*Assistant Examiner* — Jorge Peche
(74) *Attorney, Agent, or Firm* — Mori & Ward, LLP

(57) ABSTRACT

A robot system includes a plurality of robots, a control device, a common work table, and a calibration device. The control device is configured to control the plurality of robots. On the common work table, the plurality of robots are configured to work. Based on a position of a first robot having a calibrated coordinate relative to a position of a second robot among the plurality of robots, the calibration device is configured to calibrate a coordinate of the second robot.

6 Claims, 9 Drawing Sheets

(56) References Cited

U.S. PATENT DOCUMENTS

| | | | |
|---|---|---|---|
| 6,356,807 B1 * | 3/2002 | McGee et al. | 700/253 |
| 6,408,252 B1 * | 6/2002 | De Smet | 702/94 |
| 6,516,248 B2 * | 2/2003 | McGee et al. | 700/254 |
| 7,979,159 B2 * | 7/2011 | Fixell | 700/251 |
| 8,457,786 B2 * | 6/2013 | Andersson | 700/245 |
| 2005/0027394 A1 * | 2/2005 | Graf et al. | 700/245 |
| 2005/0273198 A1 * | 12/2005 | Bischoff | 700/248 |
| 2005/0273199 A1 * | 12/2005 | Ban et al. | 700/248 |
| 2008/0221733 A1 * | 9/2008 | Morrow et al. | 700/258 |
| 2010/0161125 A1 * | 6/2010 | Aoba et al. | 700/254 |
| 2012/0078418 A1 * | 3/2012 | Borm et al. | 700/254 |
| 2012/0323357 A1 * | 12/2012 | Izumi et al. | 700/228 |
| 2012/0323363 A1 * | 12/2012 | Izumi et al. | 700/248 |

OTHER PUBLICATIONS

Extended European Search Report for corresponding EP Application No. 14157577.9-1807, Jan. 26, 2015.

Chinese Office Action for corresponding CN Application No. 201410099392.1, Jun. 3, 2015.

* cited by examiner

ROBOT SYSTEM, CALIBRATION METHOD, AND METHOD FOR PRODUCING TO-BE-PROCESSED MATERIAL

CROSS-REFERENCE TO RELATED APPLICATIONS

The present application claims priority under 35 U.S.C. §119 to Japanese Patent Application No. 2013-053528, filed Mar. 15, 2013. The contents of this application are incorporated herein by reference in their entirety.

BACKGROUND

1. Field of the Invention

The present invention relates to a robot system, a calibration method, and a method for producing a to-be-processed material.

2. Discussion of the Background

Japanese Patent No. 3632278 discloses a robot system in which two adjacent robots cooperate to work in an attempt to improve production efficiency. The robot system according to Japanese Patent No. 3632278 calculates a coordinate transformation matrix between the plurality of robots using a reference point.

SUMMARY

According to one aspect of the present disclosure, a robot system includes a plurality of robots, a control device, a common work table, and a calibration device. The control device is configured to control the plurality of robots. On the common work table, the plurality of robots are configured to work. Based on a position of a first robot having a calibrated coordinate relative to a position of a second robot among the plurality of robots, the calibration device is configured to calibrate a coordinate of the second robot.

According to another aspect of the present disclosure, a calibration method includes, based on a position of one robot having a calibrated coordinate relative to a position of another robot among a plurality of robots, calibrating a coordinate of the another robot, the plurality of robots being is configured to operate using a common work table by a control device.

According to the other aspect of the present disclosure, a method is for producing a to-be-processed material processed on a common work table by a plurality of robots operated by a control device. Based on a position of one robot having a calibrated coordinate relative to a position of another robot among the plurality of robots, a coordinate of the another robot is calibrated. The to-be-processed material is processed using calibrated coordinates of the plurality of robots.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
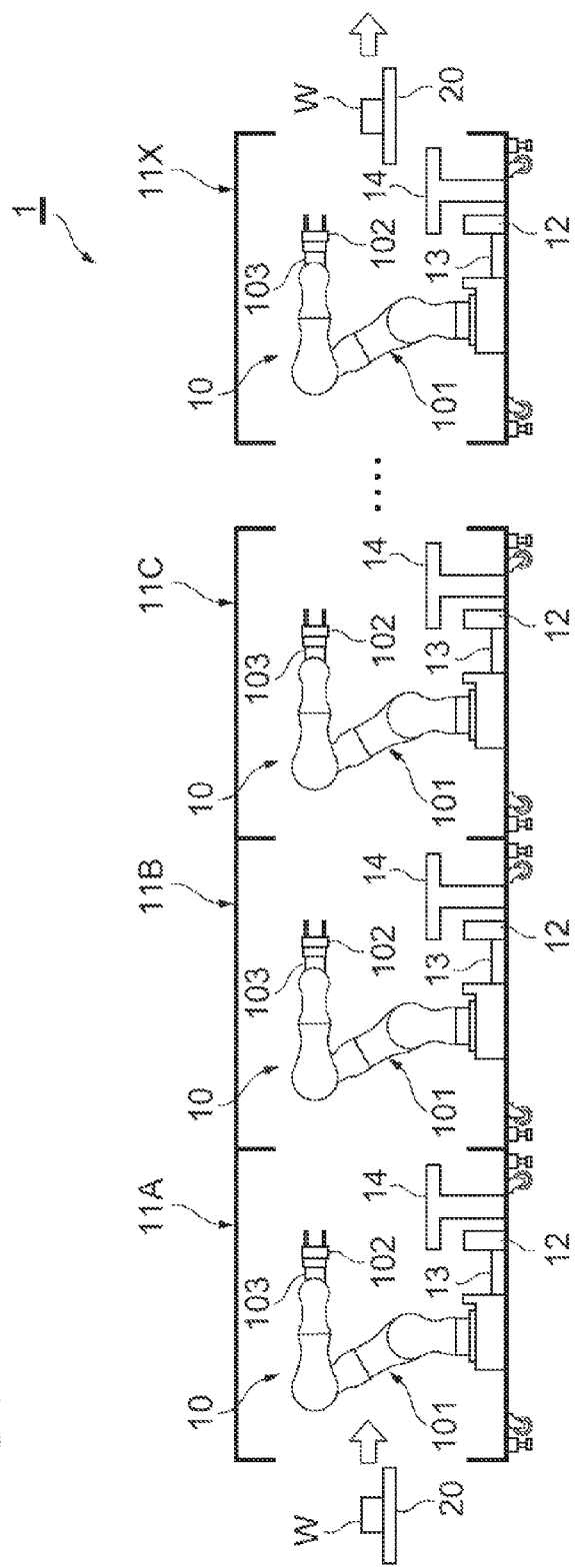
FIG. 1 is a schematic side view of a robot system according to a first embodiment.

The embodiments will now be described with reference to the accompanying drawings, wherein like reference numerals designate corresponding or identical elements throughout the various drawings.

First Embodiment

The robot system according to this embodiment is a system to calibrate a coordinate system (robot coordinate system) used to operate a robot. Exemplary applications of the robot system include, but are not limited to: work of teaching the robot (its position relative to the work table) before the system activates; and moving the robot relative to the work table. A possible example of the robot system according to this embodiment is a robot system to process a single part and a combination product of a plurality of parts, or a semi-finished product such as a workpiece (to-be-processed material). For ease of description and understanding, the following description takes as an example what is called a cell production system, in which robots accommodated in cells perform various kinds of work such as processing and assembly. The to-be-processed material may be any articles subject to processing such as conveyance and fitting in robot systems. Examples of the to-be-processed material include, but are not limited to, parts such as bolts, substrate assemblies for electronic use, automobiles, and processed food.

FIG. 1 is a schematic side view of a robot system 1 according to the embodiment. As shown in FIG. 1, the robot system 1 according to this embodiment is a robot system including movable cells 11 (cell 11A, cell 11B, cell 11C, . . . , cell 11X) of the same configuration. The cells 11 are coupled together to constitute a production line.

In each of the cells 11, a robot 10 is disposed to perform various kinds of work on a workpiece W. The robot 10 includes a robot arm 101. To the distal end of the robot arm 101, a tool 102 is mounted. The tool 102 is capable of holding a to-be-processed material or another object. The tool 102 is an end effector such as a hand. A plurality of sensors may be mounted to the distal end of the robot arm 101. In this embodiment, an inner force sensor 103 is disposed between the distal end of the robot arm 101 and the tool 102. The tool 102 includes a laser sensor 120 capable of measuring the distance to an object. Details of these sensors, including their operations, will be described later.

Each of the cells 11 accommodates an individual work table 14 and a controller 12 to control the robot 10. The controller 12 is coupled to the robot 10 through a cable harness 13. The robot 10 and the controller 12 may be coupled to each other wirelessly, or the controller 12 may be built in the robot 10.

The cell 11A is disposed at an uppermost stream position on the production line, and receives a workpiece (to-be-processed material) W placed on a common work table 20. The common work table 20 is a work table shared among the plurality of robots 10. The robot 10 (uppermost stream robot) accommodated in the uppermost stream cell 11A receives the common work table 20, places the workpiece W onto the individual work table 14, processes the workpiece W, and forwards the common work table 20 to the robot 10 accommodated in the cell 11B. The robot 10 accommodated in the cell 11B receives the common work table 20, places the workpiece W onto the individual work table 14, processes the workpiece W, and forwards the common work table 20 to the robot 10 accommodated in the cell 11C. This operation is sequentially repeated until the robot 10 (lowermost stream robot) accommodated in the cell 11X, which is disposed at a lowermost stream position, receives the common work table 20 and performs predetermined processing. Then, the common work table 20 and the processed workpiece W are conveyed out of the cell 11X.

Figure 2:
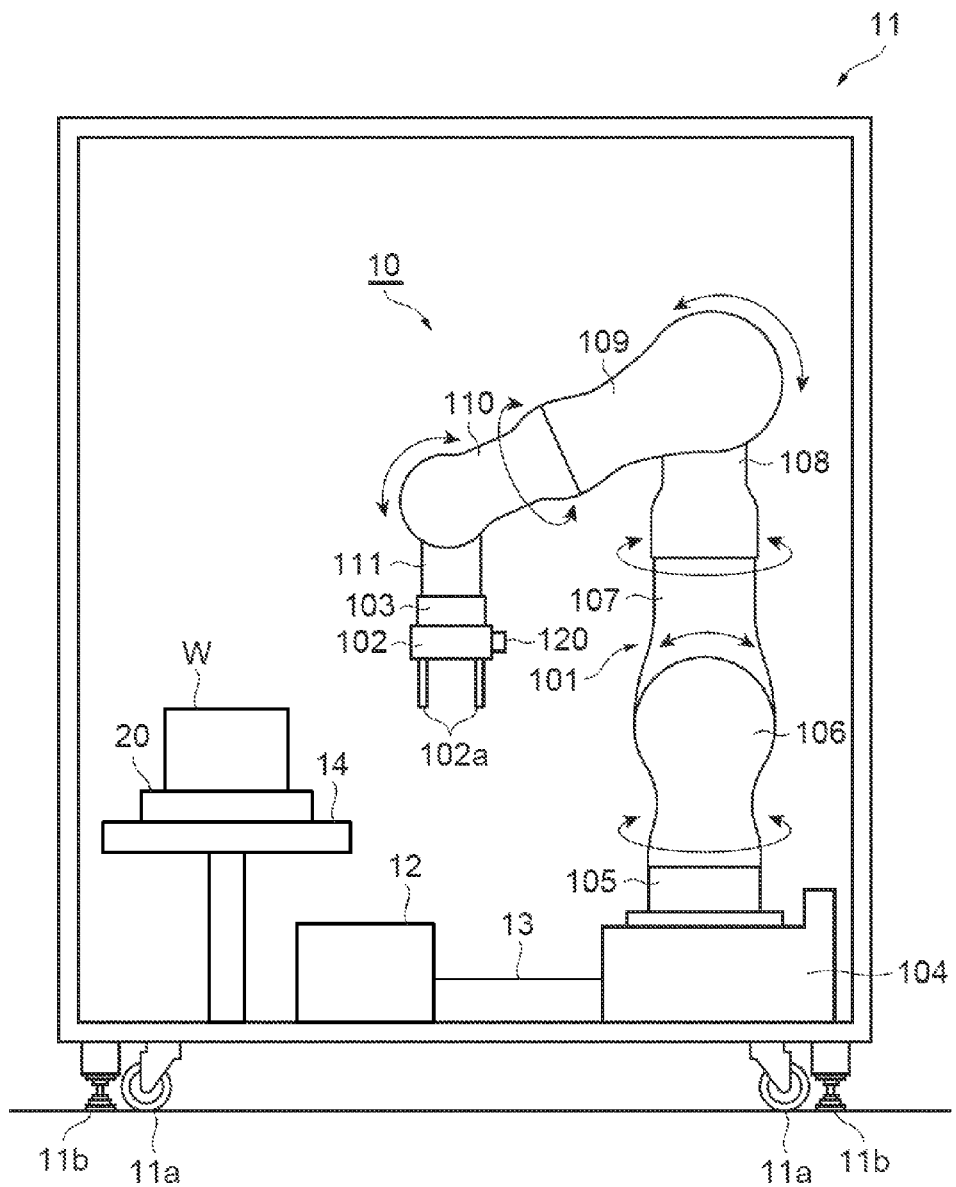
FIG. 2 is a side view of one cell included in the robot system shown in FIG. 1.

Next, an internal configuration of each cell 11 will be described in detail by referring to FIG. 2. FIG. 2 is a side view of one cell included in the robot system 1 shown in FIG. 1. The cell 11 includes casters 11a and stoppers 11b on the lower surface of the frame. The casters 11a and the stoppers 11b facilitate the movement and fixation of the cell 11. The outer wall on the front side of the cell 11 is where the following elements, not shown, are collectively disposed: an opening through which the workpiece W is supplied and taken out; a monitor on which to check the work status of the robot; and various gauges and switches. This ensures that the operator only needs to be positioned on the front side of the cell 11 when operating the robot system 1. Each outer wall of the cell 11 has a window (not shown) on a part of the outer wall. The window is made of polycarbonate superior in transparency and impact resistance, and thus enables the operator to check the work status through the window.

As shown in FIG. 2, the robot 10 includes a base 105 and the robot arm 101. The base 105 is secured on a mount 104. The robot arm 101 extends upward from the base 105.

The robot arm 101 is made up of six arms coupled to each other, namely, a first arm 106, a second arm 107, a third arm 108, a fourth arm 109, a fifth arm 110, and a sixth arm 111, in the order from the base end (base 105) side. Each of these arms accommodates an actuator to drive the arm into rotation as indicated by the two-headed arrows shown in FIG. 2 at joints where the arms are coupled to each other.

At the distal end of the robot arm 101, the tool 102 is disposed. The tool 102 is driven into rotation by the actuator accommodated in the sixth arm 111, which is at the distal end of the robot arm 101. In this embodiment, the tool 102 is a hand capable of holding a to-be-processed material. In the tool 102, an actuator is disposed to drive a pair of holding claws 102a, which are mounted to the distal end of the tool 102. Examples of the holding claws 102a are two rectangular-parallelepiped shapes with holding planes opposed to each other to hold the to-be-processed material. The side surfaces of the holding claws 102a are planes orthogonal to the two holding planes. The plane of the tool 102 on which the holding claws 102a are upright is orthogonal to the holding planes and to the side surfaces of the holding claws 102a. That is, the hand has three planes orthogonal to each other.

Between the tool 102 and the sixth arm 111, which is at the distal end of the robot arm 101, the inner force sensor 103 is disposed. The inner force sensor 103 is what is called a 6-axis inner force sensor, which is capable of simultaneously detecting a total of six components, namely, force components in translational three axial directions to act on a detection portion and moment components about rotational three axes.

An example of the controller 12 is a computer including an arithmetic operation device, a storage device, and an input-output device. The controller 12 outputs an operation command to control operation of the robot 10. Specifically, the controller 12 is coupled to the actuators of the robot 10 through the cable harness 13, and drives the actuators using the operation command, thus controlling operation of the robot 10. Under the control of the controller 12, the robot 10 operates the first arm 106, the second arm 107, the third arm 108, the fourth arm 109, the fifth arm 110, the sixth arm 111, the tool 102, and the holding claws 102a. The controller 12 is also coupled to the inner force sensor 103 and the laser sensor 120 through the cable harness, and thus is capable of detecting the state of the tool 102.

The operation command that the controller 12 outputs is a command to activate a program that operates the robot 10 or a combination job of commands to activate programs that operate the robot 10. For example, a command to hold the to-be-processed material on the holding claws 102a, a command to press the tool 102 against a predetermined position, and other commands are set in advance as the operation command.

Figure 3:
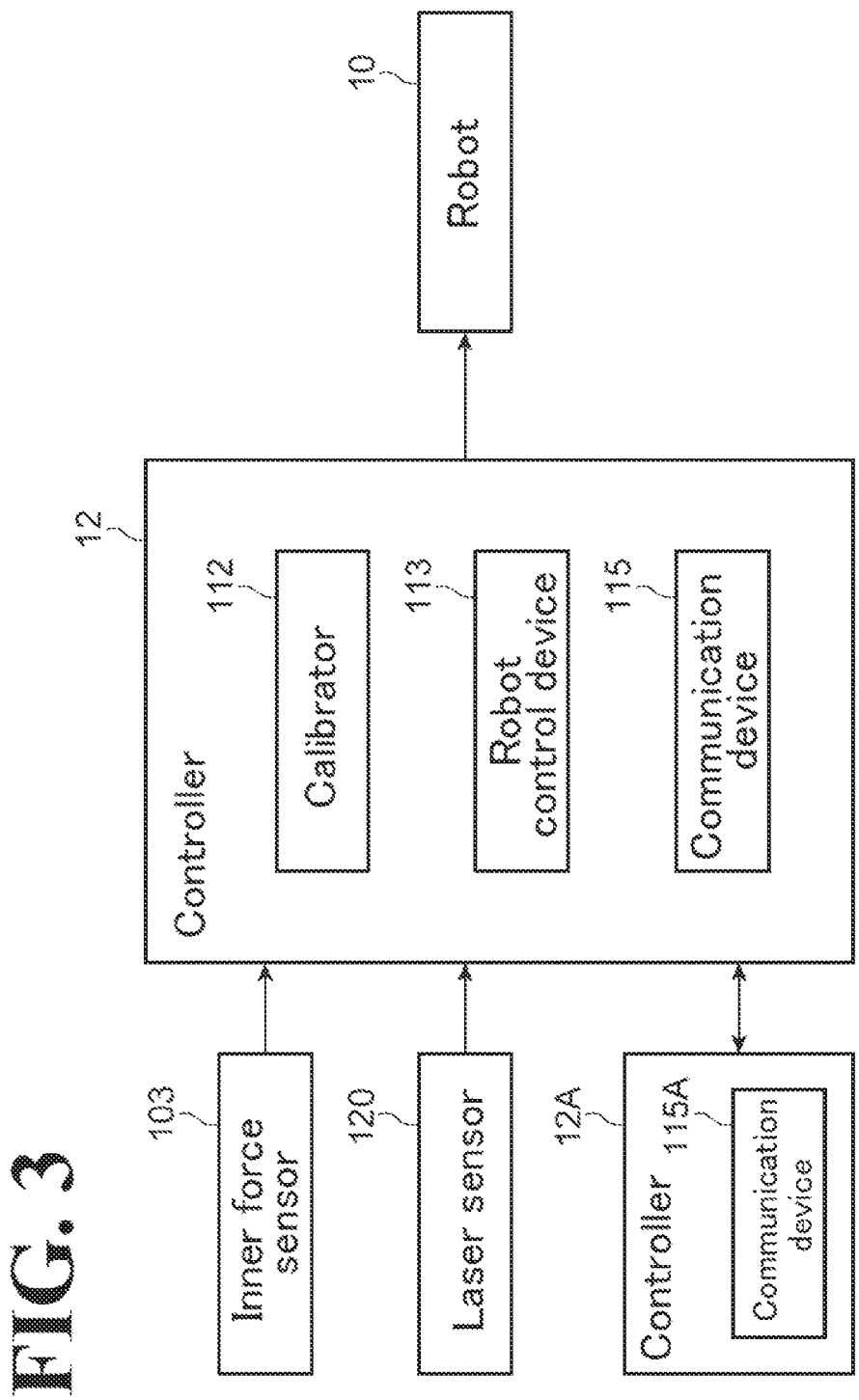
FIG. 3 is a block diagram illustrating a function of a controller shown in FIG. 2.

A function of the controller 12 will be described by referring to FIG. 3. FIG. 3 is a block diagram illustrating a function of the controller 12. As shown in FIG. 3, the controller 12 is coupled to the inner force sensor 103, the laser sensor 120, and the controller of another robot 10. The controller 12 includes a calibrator (calibration device) 112, a robot control device 113, and a communication device 115.

The robot control device 113 controls the robot 10 using robot coordinates. Before the operation of processing the to-be-processed material, the robot control device 113 presses the tool 102 against a calibration jig or a work table 30 so as to control the robot 10 to perform a calibration operation. The calibration operation is an operation of calibrating the origin and coordinate axes of the coordinate system of the robot 10. With pressing control, the robot control device 113 effects a plane-to-plane contact to fix the posture and position of the robot 10. In this manner, the robot control device 113 determines the position of the robot 10. The pressing control may be implemented using the inner force sensor 103, for example.

The calibrator 112 inputs the position of the tool 102 detected using the inner force sensor 103 or the laser sensor 120. For example, the calibrator 112 calculates a line of action of force from the force and moment detected by the inner force sensor 103, and derives as a contact position an intersection point between the line of action of the force and the surface of the robot 10 or another element. The calibrator 112 inputs as a reference position a contact position of, for example, the tool 102 that has performed a calibration operation. Then, the calibrator 112 calculates the amounts of displacement between the position at the teaching time and the reference position. The amounts of displacement that the calibrator 112 calculates include, for example, the amounts of displacement in the x, y, and z directions, and the amounts of displacement in the directions of rotation about the x axis, about the y axis, and about the z axis. Then, the calibrator 112 uses the amounts of displacement to calibrate the position of the origin and the coordinate axes at teaching time. In this manner, the calibrator 112 calibrates the robot coordinates that the robot 10 uses. Specifically, in accordance with the reference position, the calibrator 112 changes the coordinate system that the robot uses.

The communication device 115 is capable of receiving information for the drive control of the robot 10 through communication. The communication device 115 stores the received information in a recording medium included in the controller 12. As necessary, the robot control device 113 refers to the recording medium to use the information acquired through communication.

Figure 4:
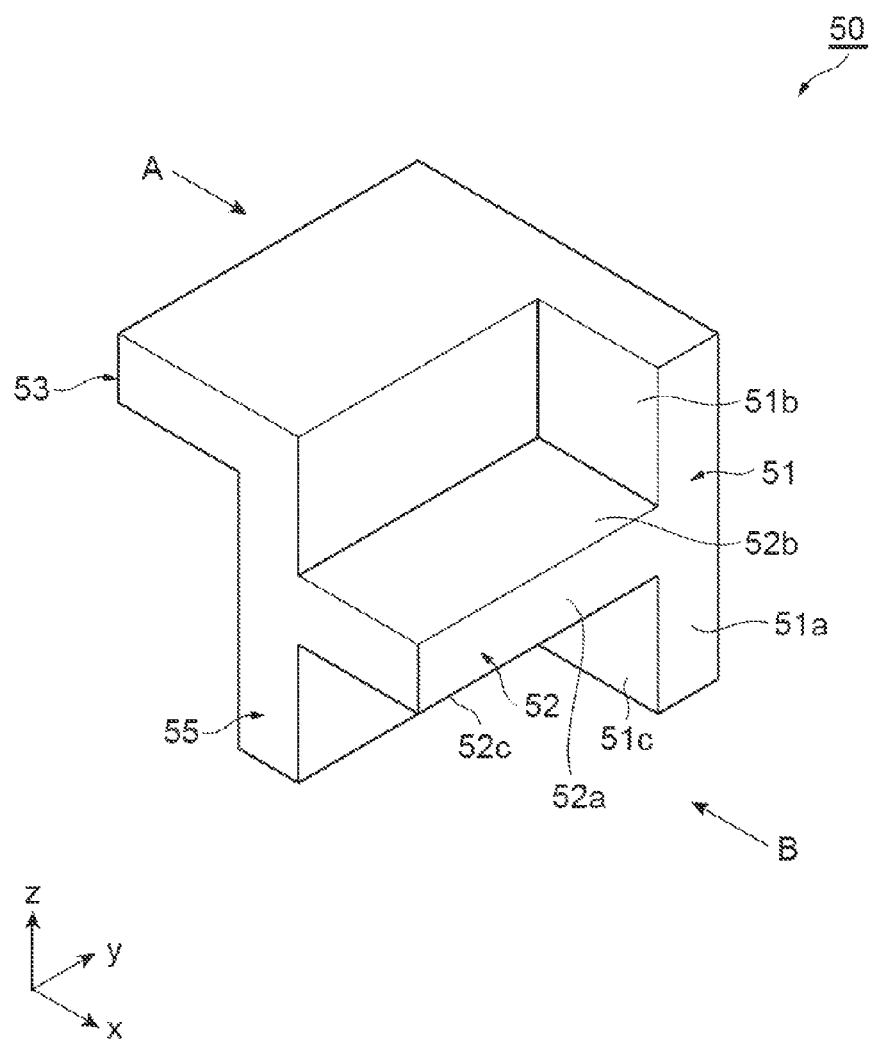
FIG. 4 is a perspective view of a calibration jig.
Figure 5:
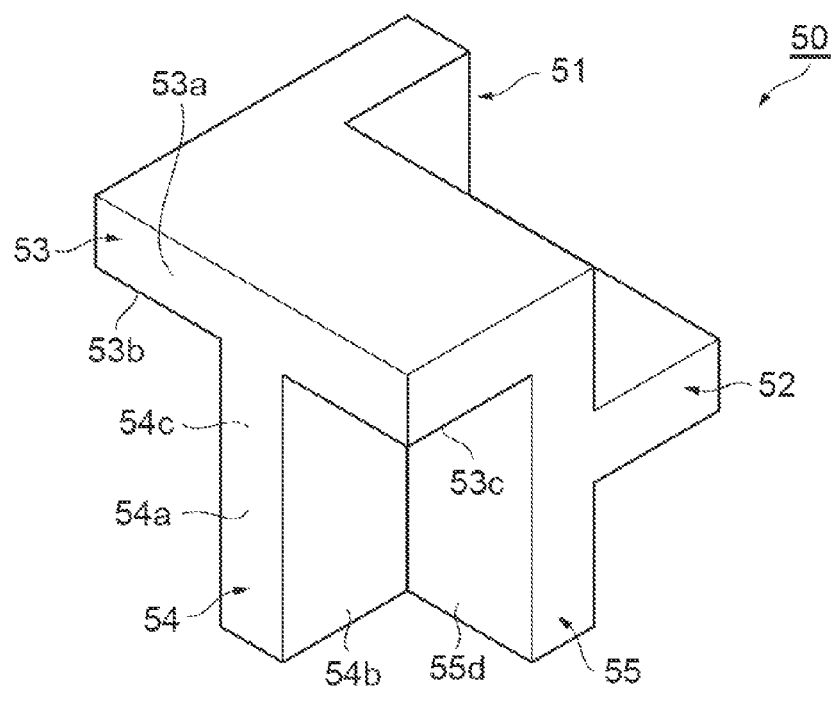
FIG. 5 is a perspective view of the jig for calibration viewed from the direction A shown in FIG. 4.

Next, a jig used in the calibration processing will be described. FIG. 4 is a perspective view of a calibration jig. The jig is handed over between the robots 10 and used when a coordinate calibration result of one robot 10 is used to calibrate the coordinate system of another robot 10. FIG. 5 is a perspective view of the jig from the A direction shown in FIG. 4.

As shown in FIGS. 4 and 5, a jig 50 has a plurality of planes. The jig 50 has protrusions of approximately T-shapes when viewed from the arrow A direction and the arrow B direction shown in FIG. 4. This enables two robots 10 to simultaneously hold the jig 50. One of the approximately T-shaped protrusions is rotated by 90 degrees about a rotation axis extending in the arrow A direction and the arrow B direction relative to the other approximately T-shaped protrusion. The rotational angle of the approximately T-shaped protrusions may not necessarily be 90 degrees; any other angle is possible. Additionally, it is only necessary to provide at least one approximately T-shaped protrusion.

As shown in FIG. 4, the jig 50 includes, for example, a rectangular parallelepiped base member 55, a rectangular parallelepiped first member 51, and a rectangular parallelepiped second member 52. The rectangular parallelepiped first member 51 and the rectangular parallelepiped second member 52 are disposed upright on a main surface of the rectangular parallelepiped base member 55. The first member 51 has a side surface 51a and side surfaces 51b and 51c. The side surface 51a is along the y-z direction, while the side surfaces 51b and 51c are along the z-x direction. The second member 52 has a side surface 52a, an upper surface 52b, and a lower surface 52c. The side surface 52a is along the y-z direction, while the upper surface 52b and the lower surface 52c are along the x-y direction. Similarly, as shown in FIG. 5, the jig 50 includes, for example, a rectangular parallelepiped third member 53 and a rectangular parallelepiped fourth member 54. The rectangular parallelepiped third member 53 and the rectangular parallelepiped fourth member 54 are disposed upright on a main surface of the rectangular parallelepiped base member 55. The third member 53 has a side surface 53a and lower surfaces 53b and 53c. The side surface 53a is along the y-z direction, while the lower surfaces 53b and 53c are along the x-y direction. The fourth member 54 has a side surface 54a and side surfaces 54b and 54c. The side surface 54a is along the y-z direction, while the side surfaces 54b and 54c are along the z-x direction.

Two robots 10 respectively hold the second member 52 and the fourth member 54 to simultaneously hold the jig 50. Assume that a first robot 10 is done with calibration. Then, the first robot 10 is able to accurately hold the jig 50 and accurately move the jig 50 to a predetermined position. In this manner, the first robot 10 is able to determine the position of the jig 50. A second robot 10 determines the three mutually orthogonal planes as contact reference positions for the force control, and calibrates the displacement of the accurately positioned jig 50 relative to the reference positions.

For example, the second robot 10 holds the second member 52 by force control. In this state, the second robot 10 performs force control to bring the plane of the tool 102 of the second robot 10 on which the holding claws 102a are upright into contact with the side surface 51a of the first member 51 and the side surface 52a of the second member 52. Further, the second robot 10 performs force control to press the side surfaces of the holding claws 102a of the second robot against the side surfaces 51b and 51c of the first member 51. Thus, the second robot 10 presses the three mutually orthogonal planes of the tool 102 against the jig 50 while holding the approximately T-shaped protrusion. In this manner, the second robot 10 determines its posture and position. The second robot 10 is able to recognize the amount of displacement between the coordinate system of the first robot 10 and the coordinate system of the second robot 10 itself. Then, the second robot 10 makes the origin position and coordinate axes of its coordinate system agree with the coordinate system of the first robot 10. Thus, the calibration completes.

The calibrator 112 may use another method in performing the calibration. For example, it is possible to use the laser sensor 120, which is capable of measuring distances from the tool 102, to acquire as reference positions measurement results (for example, distances to an adjacent robot) at x, y, and z positions.

Figure 6:
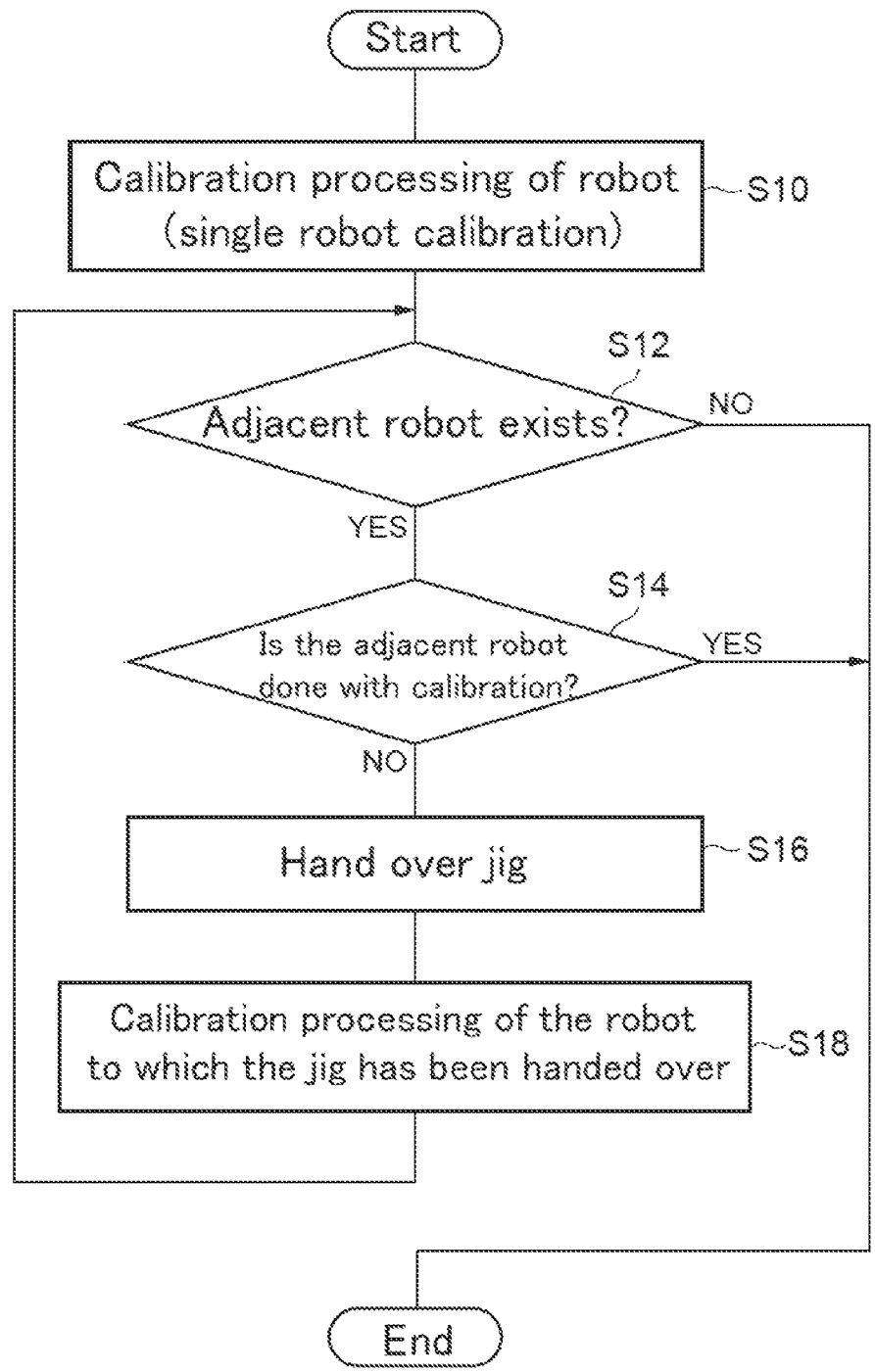
FIG. 6 is a flowchart of a procedure for a calibration method for a robot coordinate system.
Figure 7:
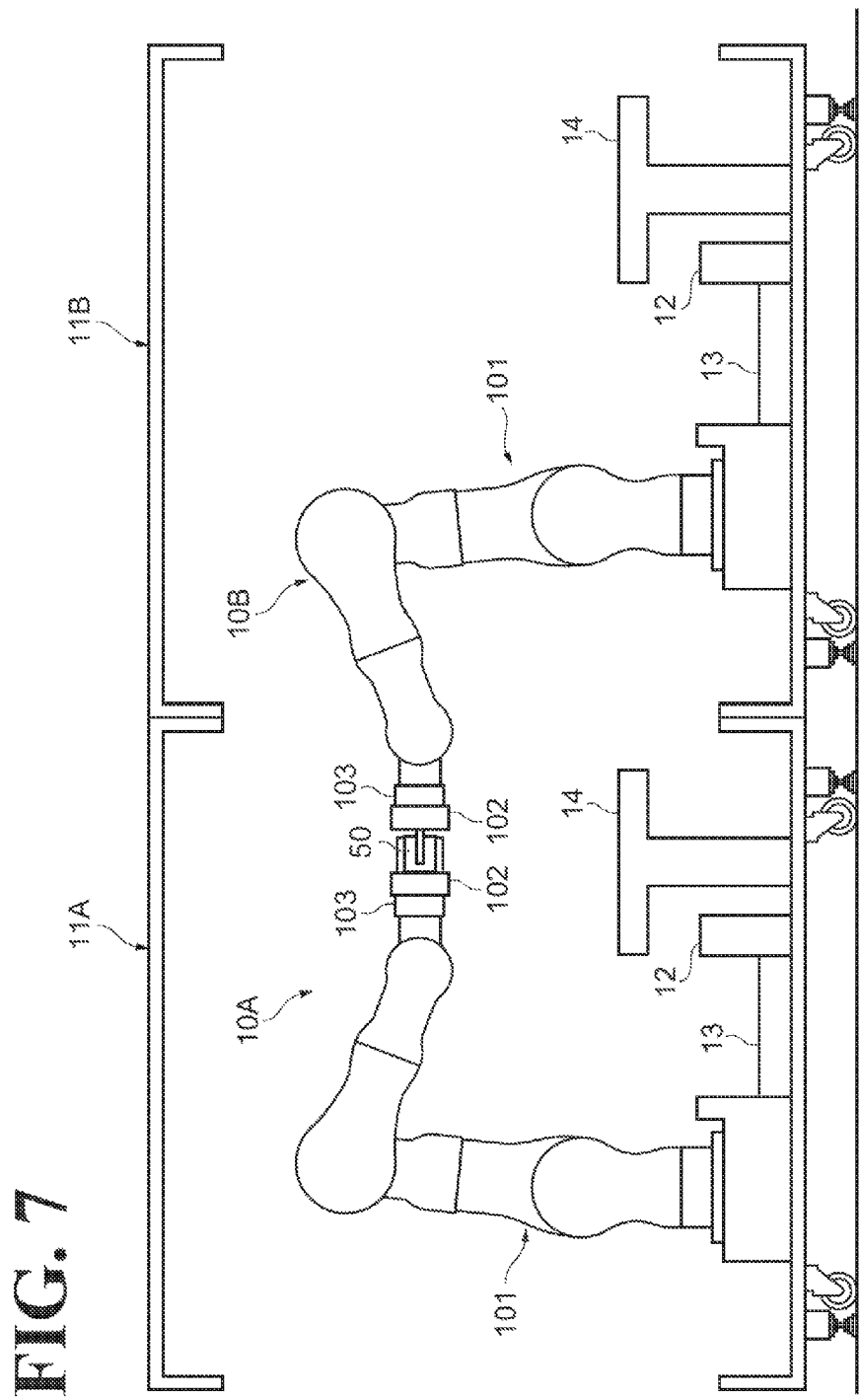
FIG. 7 is a schematic diagram illustrating a calibration procedure.

Next, a calibration method of the robot system 1 will be described by referring to FIGS. 6 and 7. FIG. 6 is a flowchart of operations in the calibration method, and FIG. 7 is a schematic diagram illustrating the calibration method. The following description will exemplify the tool 102 as a hand.

As shown in FIG. 6, the cell 11A, which is disposed at the uppermost stream position on the production line, is calibrated first of all (S10). This calibration is performed on a single robot 10 basis, and any method is possible. For example, it is possible to visually check the position of the robot 10 relative to the common work table 20 and teach the position. It is also possible for the calibrator 112 in its calibration to press a tool 102 having three mutually orthogonal planes against a jig having three mutually orthogonal planes. When the processing at S10 ends, the process proceeds to adjacent robot determination processing (S12).

In the processing at S12, the robot control device 113 determines whether an adjacent robot (adjacent robot) 10 exists based on an output signal from the sensors in the cell 11 or based on information received from the communication device 115. When in the processing at S12 the robot control device 113 determines that no adjacent robot exists, then the control processing shown in FIG. 6 ends. When in the processing at S12 the robot control device 113 determines that an adjacent robot exists, then the process proceeds to calibration confirmation processing (S14).

In the processing at S14, based on information received from the communication device 115 or other information, the robot control device 113 determines whether the adjacent robot is done with the calibration processing. When in the processing at S14 the robot control device 113 determines that the adjacent robot is done with the calibration processing, the control processing shown in FIG. 6 ends. When in the processing at S14 the robot control device 113 determines that the adjacent robot is not done with the calibration processing, the process proceeds to jig hand-over processing (S16).

In the processing at S16, the robot control device 113 hands the calibration jig over to the adjacent robot. For example, assume that the robot 10 in the cell 11B, which is adjacent to the robot 10 in the uppermost stream cell 11A, is not done with calibration. In this case, as shown in FIG. 7, the robot 10 in the uppermost stream cell 11A holds the calibration jig 50 and moves the jig 50 to a hand-over position. The hand-over position is a place set in advance in the robot 10 in the cell 11A and in the robot 10 in the cell 11B. The robot 10 in the cell 11A is already done with the calibration in the processing at S10, and thus able to accurately determine the position of the jig 50. Next, the robot 10 in the cell 11B moves its tool 102 to the hand-over position to have the tool 102 hold the jig 50, and performs force control to press the three mutually orthogonal planes of the tool 102 against the jig 50, thus determining the reference positions. The information about the reference positions may be acquired at the inner force sensor 103. When the processing at S16 ends, the process proceeds to calibration processing (calibration step) (S18).

In the processing at S18, in the robot 10 to which the jig 50 has been handed over, the calibrator 112 calibrates the robot. For example, the calibrator 112 compares the reference positions acquired in the processing at S16 with reference positions that are based on the coordinate system of the robot 10. When the comparison shows a difference, the calibrator 112 changes the coordinate system of the robot 10 into agreement with the coordinate system of the robot 10 from which the jig 50 has been hand over. For example, the calibrator 112 changes the origin position and an axis direction. When the processing at S18 ends, the process proceeds to the processing at S12.

The jig 50 is sequentially handed over throughout the control processing at S12 to S18 until no adjacent robot is left or all the robots are done with the calibration. At the time when the jig 50 is handed over, data for calibrating the coordinate system of the robot is generated, and the robot is calibrated based on the data.

Thus, the control processing shown in FIG. 6 ends. The control processing shown in FIG. 6 facilitates the calibration of the plurality of robots 10 and makes the calibration automatic. It is possible to perform the control processing shown in FIG. 6 as an offline operation prior to processing of the to-be-processed material. Thus, after the calibration processing, the robot 10 processes and produces the to-be-processed material (process step).

Incidentally, in what is called a cell production system, every time a change is made in product lot, the layout also changes by connecting or separating the cells. This necessitates calibration processing every time the layout changes, which is significantly laborious.

Contrarily, with the robot system 1 and the calibration method according to the first embodiment, the position of one calibrated robot relative to another robot is acquired by handing over the jig 50, and based on the acquired position, the coordinates of the other robot are calibrated. This ensures automatic calibration in response to a change in layout. Additionally, since the calibration is performed by handing over the jig 50, it is not necessary to position the robot adjacent to the reference point, providing a greater degree of freedom on layout.

Second Embodiment

The robot system, the calibration method, and the method for producing a to-be-processed material according to the second embodiment are approximately similar to the robot system, the calibration method, and the method for producing a to-be-processed material according to the first embodiment. The second embodiment is different from the first embodiment in that the robot 10 is disposed on a carriage, and in the form of the common work table 20. The following description will be focused on the different respects, eliminating description of those matters recited in the first embodiment.

Figure 8:
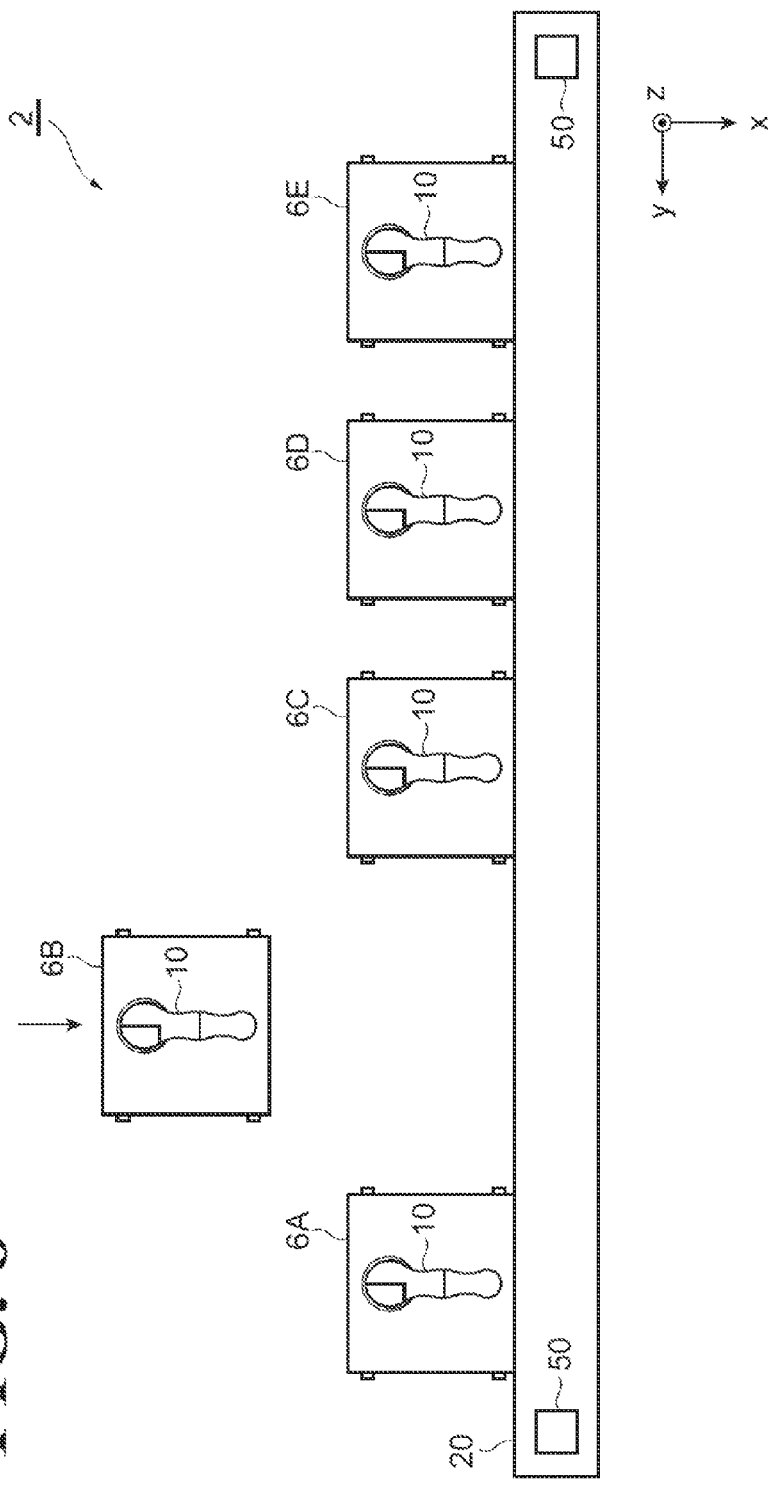
FIG. 8 is a schematic diagram illustrating a calibration procedure according to a second embodiment.

FIG. 8 is a plan view of a robot system 2 according to the second embodiment. The following description will exemplify a production line as moving a workpiece from left to right in FIG. 8. As shown in FIG. 8, the robot system 2 includes a plurality of robots 10 respectively disposed on carriages 6A to 6E. The robot 10 disposed on the carriage 6A is an uppermost stream robot, which is disposed at an uppermost stream position. The robot 10 disposed on the carriage 6E is a lowermost stream robot, which is disposed at a lowermost stream position.

Figure 9:
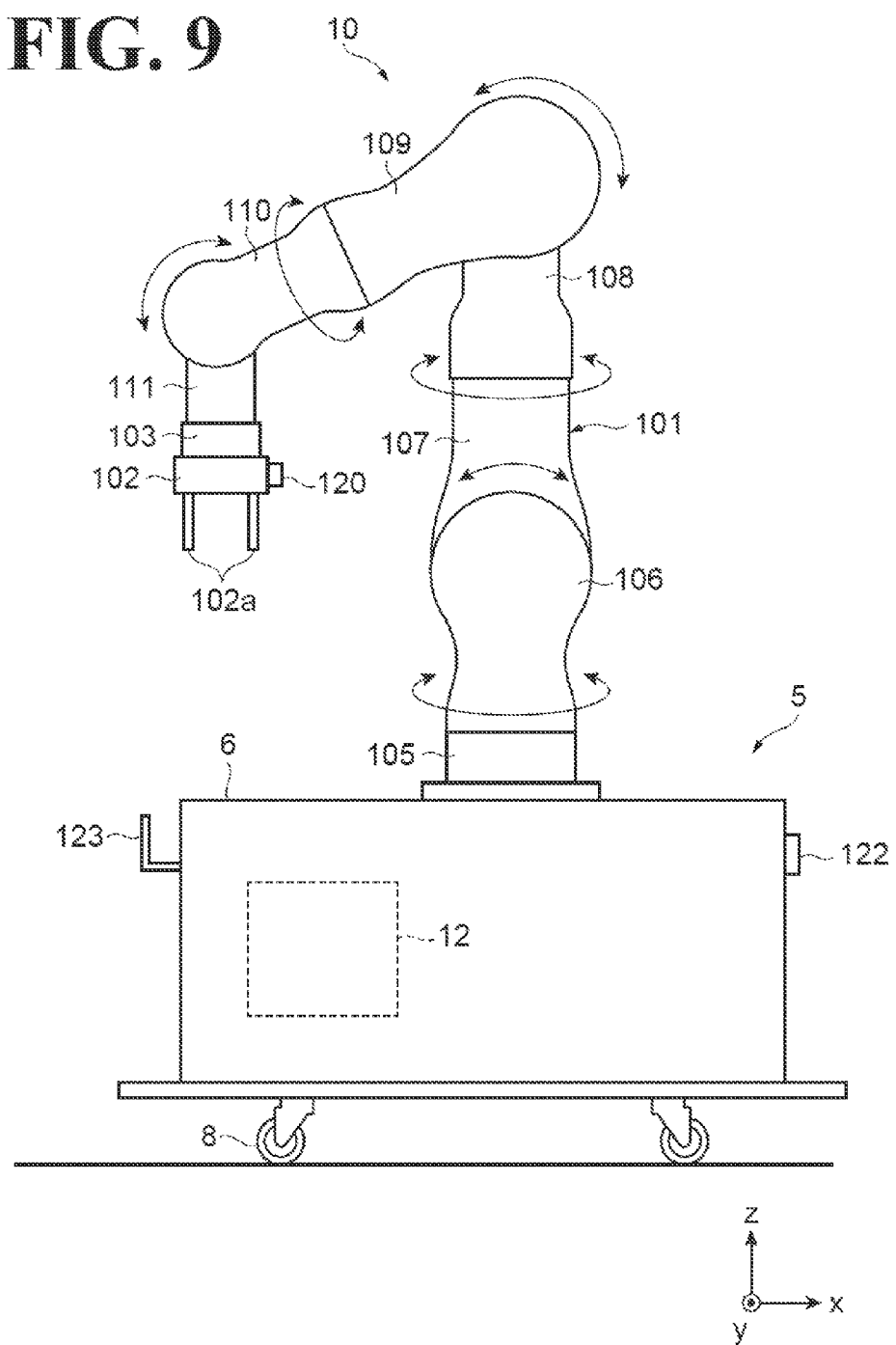
FIG. 9 illustrates a robot and movable robot included in a robot system according to the second embodiment.

Here, the robot 10 of the robot system 2 will be outlined by referring to FIG. 9. FIG. 9 is a side view of the robot 10 and a movable robot 5, illustrating these elements in detail. The robot 10 operates in a similar manner to the manner in which the robot 10 shown in FIG. 2 operates. The movable robot 5 includes a carriage 6 and drive wheels 8. The carriage 6 supports the robot 10 and accommodates control-related devices. The carriage 6 accommodates, for example, a drive source (not shown) to drive the drive wheels 8, and a controller 12, described later, to perform operation control of the robot 10 and the movable robot 5. A plurality of sensors may be mounted to the carriage 6. In this embodiment, the carriage 6 is provided with an obstacle sensor 122 to detect an obstacle in the travel direction. The carriage 6 is also provided with an antenna 123 and other elements to provide wireless communication for information necessary in control. The movable robot 5 is capable of traveling in the x-y direction by driving the drive wheels 8. Also the movable robot 5 is capable of stopping itself immediately before the work table 30 using the obstacle sensor 122. The controller 12 not only controls the robot 10 but also controls the movable robot 5. For example, the controller 12 controls the movable robot 5 to move along a travel path taught in advance.

Referring back to FIG. 9, the plurality of robots 10 share the work table 20. That is, the plurality of robots 10 process to-be-processed materials on the same work table 20. Since the robots 10 are movable, another robot that is new to the work table 20 may use the common work table 20. In this case, the new robot needs calibration processing.

The jig 50 is disposed at one end (upstream) of the common work table 20. Here, assume that the robot 10 on the carriage 6A is done with calibration. For example, when the calibration jig is fixed to the common work table 20, it is possible to use the fixed jig for calibration. After the calibration, the robot 10 on the carriage 6A picks up the jig 50 and hands the jig 50 over to the robot 10 on the carriage 6B. The calibration processing at the time of handing over is similar to the calibration processing in the first embodiment. This ensures calibration of all the plurality of robots using the jig 50. Also in this case, the jig 50 can be handed over within the reachable range of the arm of the robot 10. This ensures calibration of, for example, a robot that has not reached the common work table 20, such as the robot 10 on the carriage 6B.

The transfer of the jig 50 may not necessarily be from one end (upstream) to the other end (lower stream) of the common work table 20. The transfer of the jig 50 may also be from the other end (lower stream) to the one end (upstream) of the common work table 20 individually or simultaneously with the transfer from the one end to the other end of the common work table 20, as shown in FIG. 8. In this case, for example, the robot 10 on the carriage 6A on the upper stream side hands the jig 50 over to the robot 10 on the carriage 6B, while at the same time the robot 10 on the carriage 6E on the lower stream side hands the jig 50 over to the robot 10 on the carriage 6D. Then, the robots (intermediate robots) that exist between the robot 10 on the carriage 6A on the upper stream side and the robot 10 on the carriage 6E on the lower stream side may calibrate the robot coordinate systems of the intermediate robots themselves using an average value of the calibration result (positional displacement) for the robot 10 on the carriage 6E on the lower stream side and the calibration result (positional displacement) for the robot 10 on the carriage 6A on the upper stream side.

Further, the jig 50 on the lower stream side may be fixed to the common work table 20. The robot 10 on the carriage 6E on the lower stream side calculates in its calibration the amount of positional displacement using the jig 50 transmitted from the upper stream side. Then, the robot 10 on the carriage 6E may make a comparison for the operation using the result of this calibration so as to evaluate (check) the amount of positional displacement in the case of using the jig 50 fixed to the common work table 20.

With the robot system 2 and the calibration method according to the second embodiment, the position of one calibrated robot relative to another robot is acquired by handing over the jig 50, and based on the acquired position, the coordinates of the other robot are calibrated. This ensures automatic calibration in response to a change in layout. Additionally, since the calibration is performed by handing over the jig 50, it is not necessary to position the robot adjacent to the reference point, providing a greater degree of freedom on layout.

The holding planes of the tool 102 each may have depressions and protrusions insofar as an imaginary plane is ensured (such as by positioning the tops of the protrusions at the same height). Other planes that are not described in relation to the tool 102 and the jig 50 may not necessarily be planes.

In the above-described embodiments, each of the robots 10 has an individual calibrator 112. When an upper device communicative to the controllers 12 of the robots 10 is available, the upper device may function as a calibrator 112 to perform calibration processing of the robots 10. It is also possible for adjacent controllers 12 to communicate with each other to control another controller 12 to perform the calibration processing.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot system comprising:
   a plurality of robots arranged along a line;
   a control device configured to control the plurality of robots;
   a common work table on which the plurality of robots are configured to work; and
   a calibration device configured to, based on a position of a first robot having a calibrated coordinate relative to a position of a second robot among the plurality of robots, calibrate a coordinate of the second robot,
   wherein the calibration device is configured to calibrate a coordinate of an uppermost stream robot among the plurality of robots based on a position of the uppermost stream robot relative to a position of the common work table, the uppermost stream robot being configured to work at an uppermost stream position of the line, and the calibration device is configured to calibrate a coordinate of an intermediate robot among the plurality of robots based on a position of the uppermost stream robot relative to the position of the common work table, the intermediate robot being disposed at a lower stream position on the line than the position of the uppermost stream robot,
   wherein the calibration device is configured to calibrate a coordinate of a lowermost stream robot based on a position of the lowermost stream robot relative to the position of the common work table, the lowermost stream robot being configured to work at a lowermost stream position on the line, and the calibration device is configured to calibrate the coordinate of the intermediate robot based on the position of the lowermost stream robot relative to the position of the intermediate robot disposed at an upper stream position than the position of the lowermost stream robot, and
   wherein the calibration device is configured to use a calibration result of the uppermost stream robot and a calibration result of the lowermost stream robot to calibrate the coordinate of the intermediate robot.

2. The robot system according to claim 1, wherein the calibration device is configured to calibrate the coordinate of the first robot based on the position of the first robot relative to the position of the common work table.

3. The robot system according to claim 2, wherein the calibration device is configured to calibrate
   a coordinate of a third robot among the plurality of robots based on the position of the first robot relative to the position of the second robot, and configured to evaluate a calibration result of a last calibrated robot based on a position of the last calibrated robot relative to the position of the common work table.

4. The robot system according to claim 1, wherein the calibration device is configured to calibrate a coordinate of a third robot among the plurality of robots based on the position of the first robot relative to the position of the second robot, and configured to evaluate a calibration result of a last calibrated robot based on a position of the last calibrated robot relative to the position of the common work table.

5. A calibration method comprising:
   based on a position of one robot having a calibrated coordinate relative to a position of another robot among a plurality of robots arranged along a line, calibrating a coordinate of the another robot, the plurality of robots being configured to operate using a common work table by a control device,
   wherein the calibrating of the another robot includes:
   calibrating a coordinate of an uppermost stream robot among the plurality of robots based on a position of the uppermost stream robot relative to a position of the common work table, the uppermost stream robot being configured to work at an uppermost stream position of the line, and calibrating a coordinate of an intermediate robot among the plurality of robots based on a position of the uppermost stream robot relative to the position of the common work table, the intermediate robot being disposed at a lower stream position on the line than the position of the uppermost stream robot;
   calibrating a coordinate of a lowermost stream robot based on a position of the lowermost stream robot relative to the position of the common work table, the lowermost stream robot being configured to work at a lowermost stream position on the line, and calibrating the coordinate of the intermediate robot based on the position of the lowermost stream robot relative to the position of the intermediate robot disposed at an upper stream position than the position of the lowermost stream robot; and
   calibrating the coordinate of the intermediate robot using a calibration result of the uppermost stream robot and a calibration result of the lowermost stream robot.

6. A method for producing a to-be-processed material processed on a common work table by a plurality of robots arranged along a line operated by a control device comprising:
   based on a position of one robot having a calibrated coordinate relative to a position of another robot among the plurality of robots, calibrating a coordinate of the another robot~ wherein the calibrating of the another robot includes:

calibrating a coordinate of an uppermost stream robot among the plurality of robots based on a position of the uppermost stream robot relative to a position of the common work table, the uppermost stream robot being configured to work at an uppermost stream position of the line, and calibrating a coordinate of an intermediate robot among the plurality of robots based on a position of the uppermost stream robot relative to the position of the common work table, the intermediate robot being disposed at a lower stream position on the line than the position of the uppermost stream robot;

calibrating a coordinate of a lowermost stream robot based on a position of the lowermost stream robot relative to the position of the common work table, the lowermost stream robot being configured to work at a lowermost stream position on the line, and calibrating the coordinate of the intermediate robot based on the position of the lowermost stream robot relative to the position of the intermediate robot disposed at an upper stream position than the position of the lowermost stream robot; and calibrating the coordinate of the intermediate robot using a calibration result of the uppermost stream robot and a calibration result of the lowermost stream robot: and processing the to-be-processed material using calibrated coordinates of the plurality of robots.

\* \* \* \* \*